UNITED STATES PATENT OFFICE.

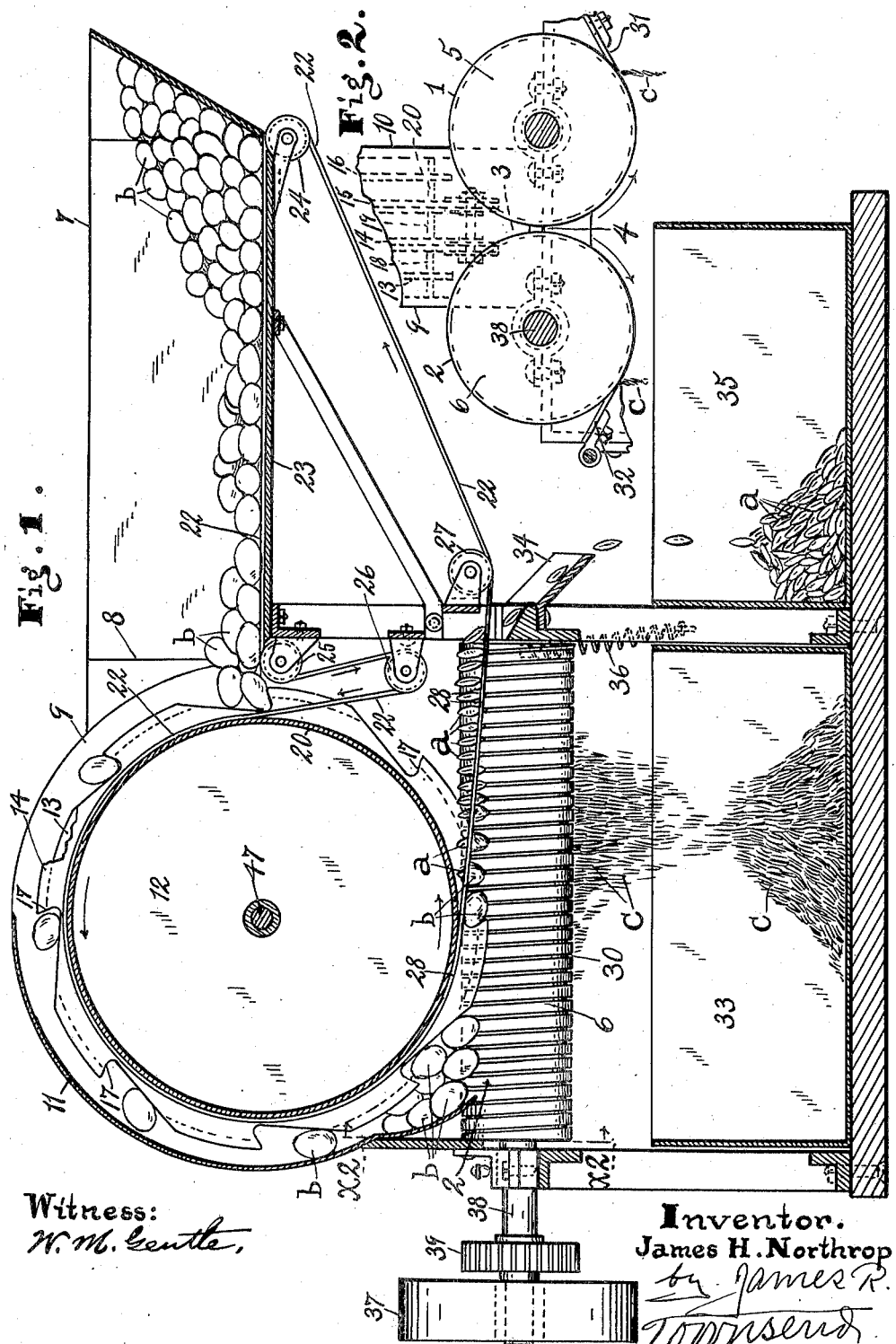

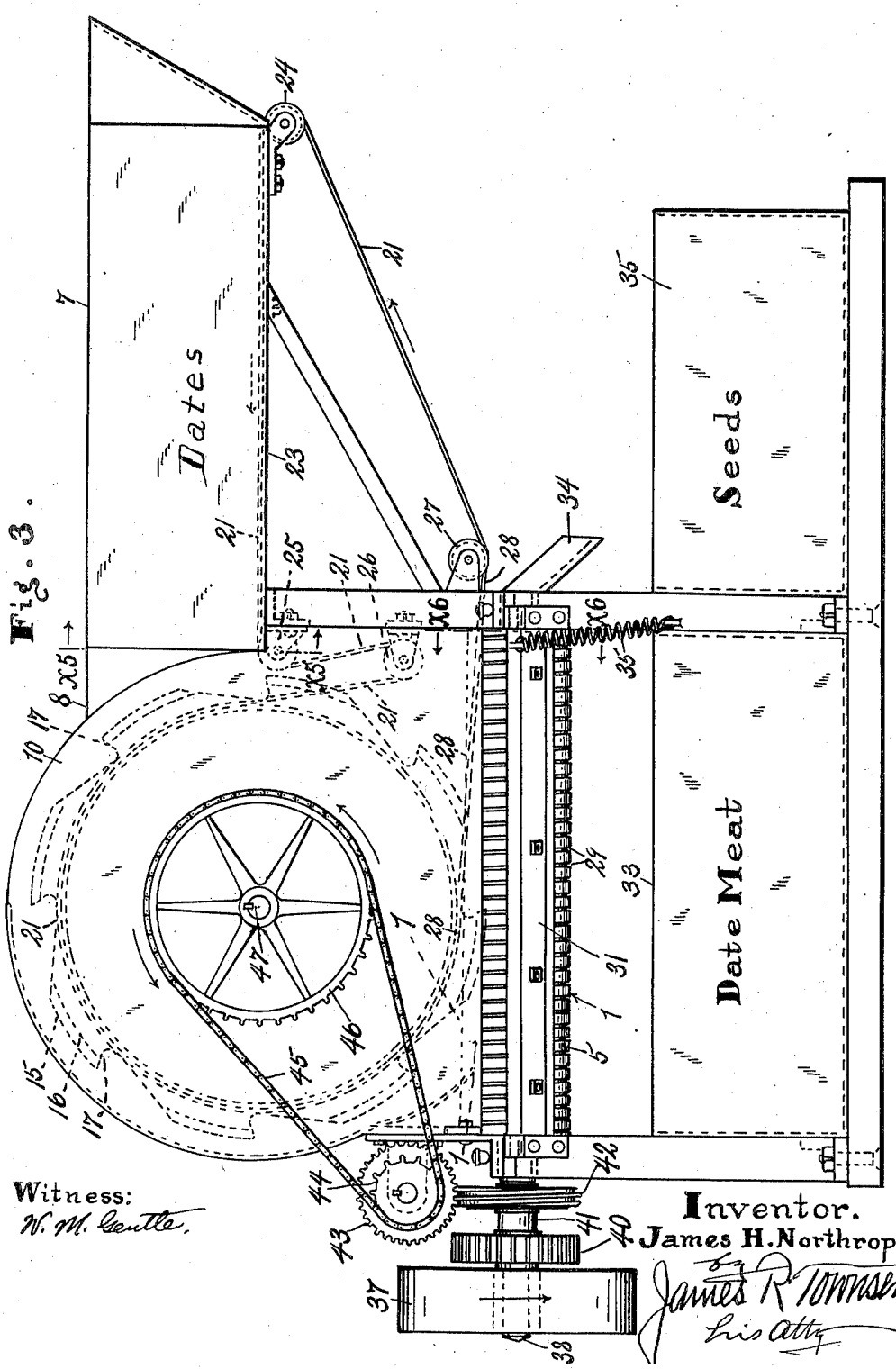

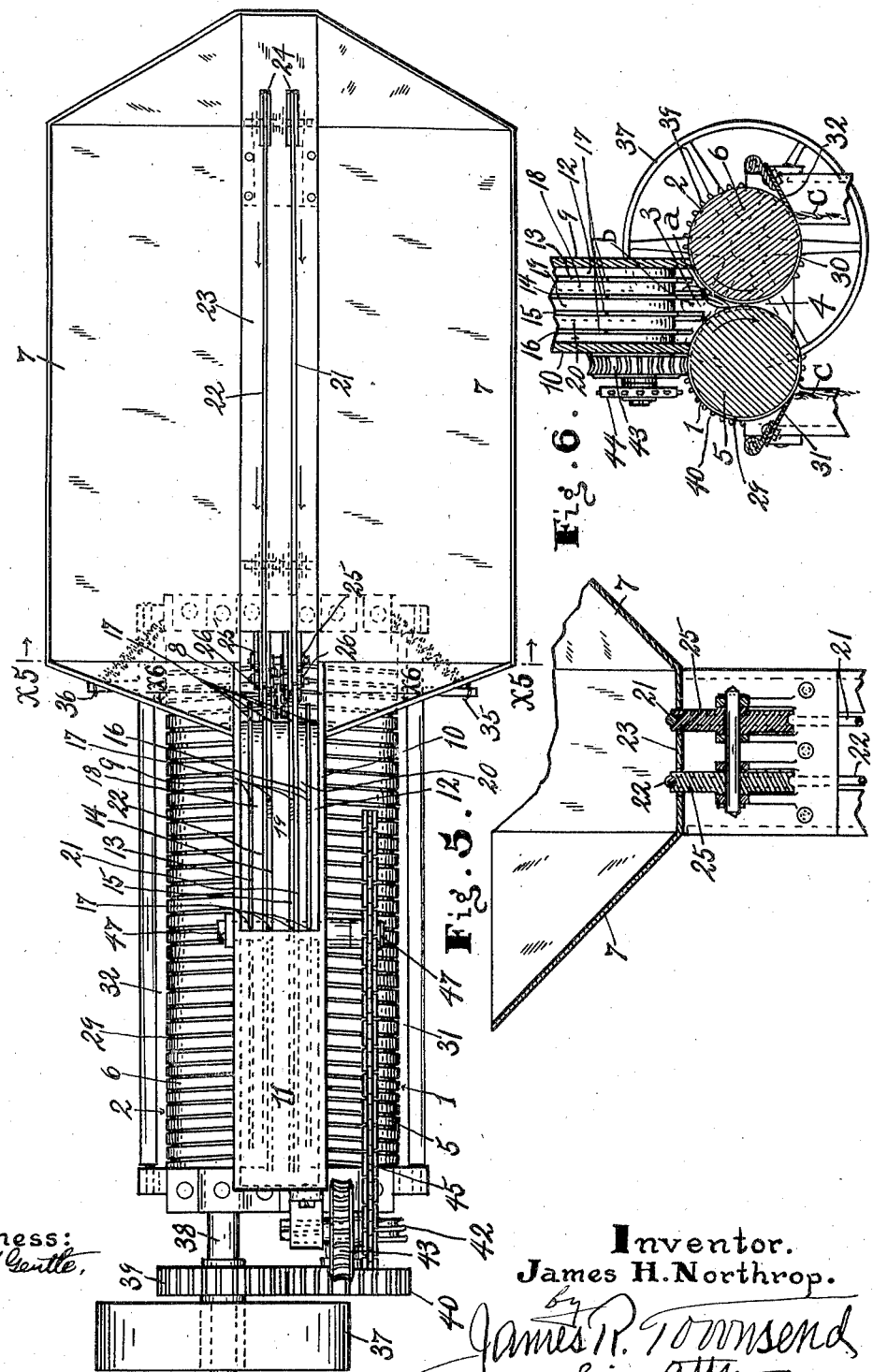

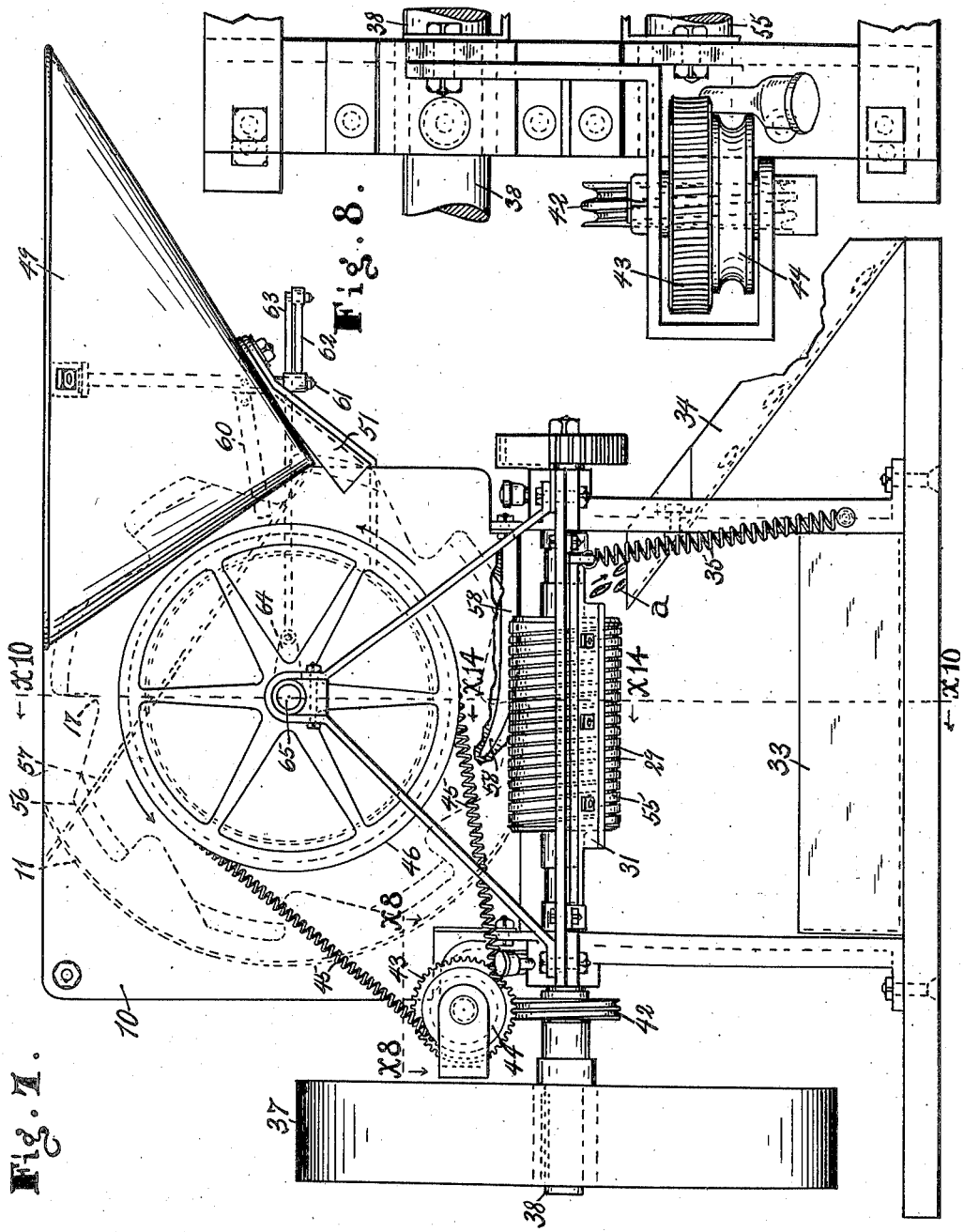

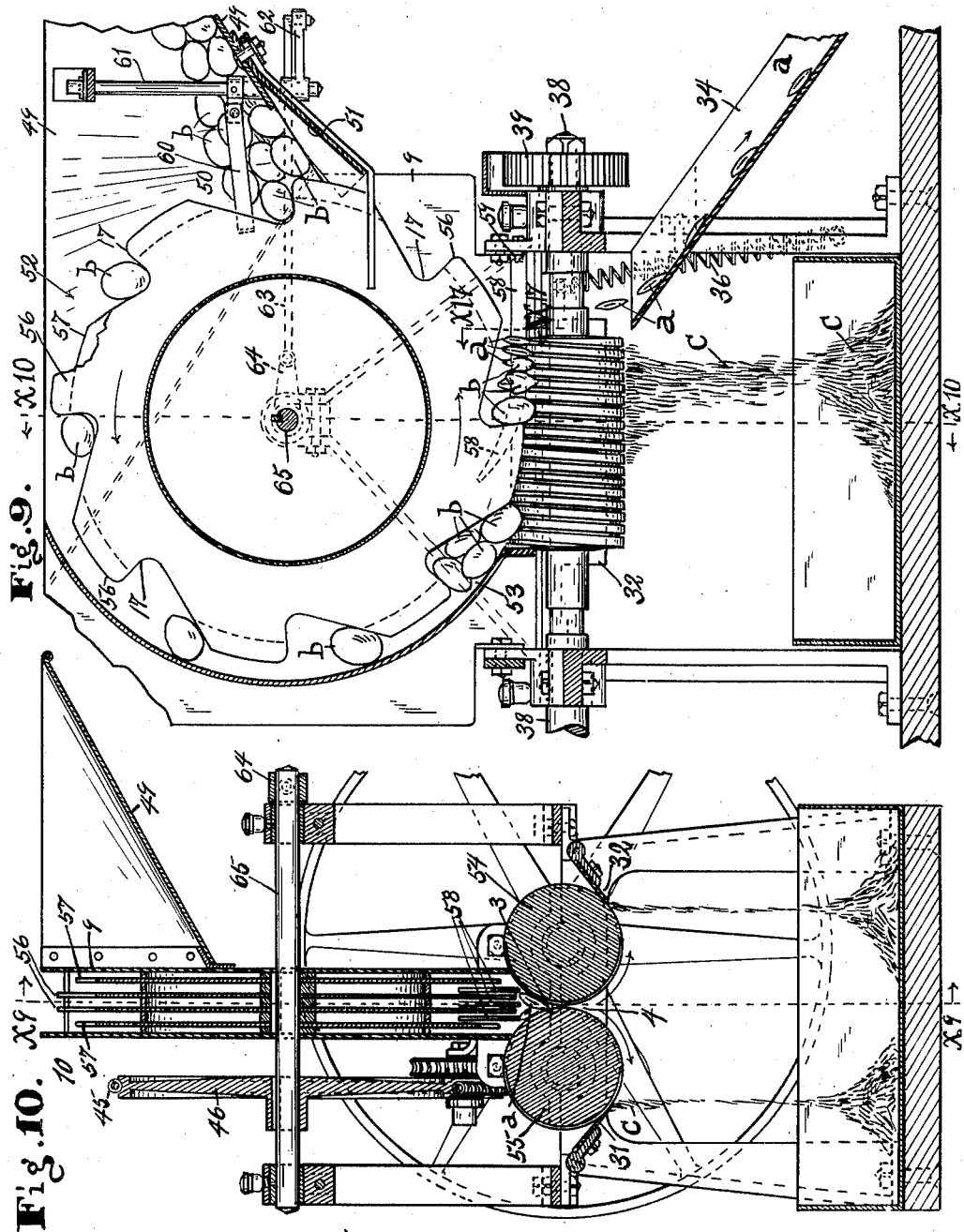

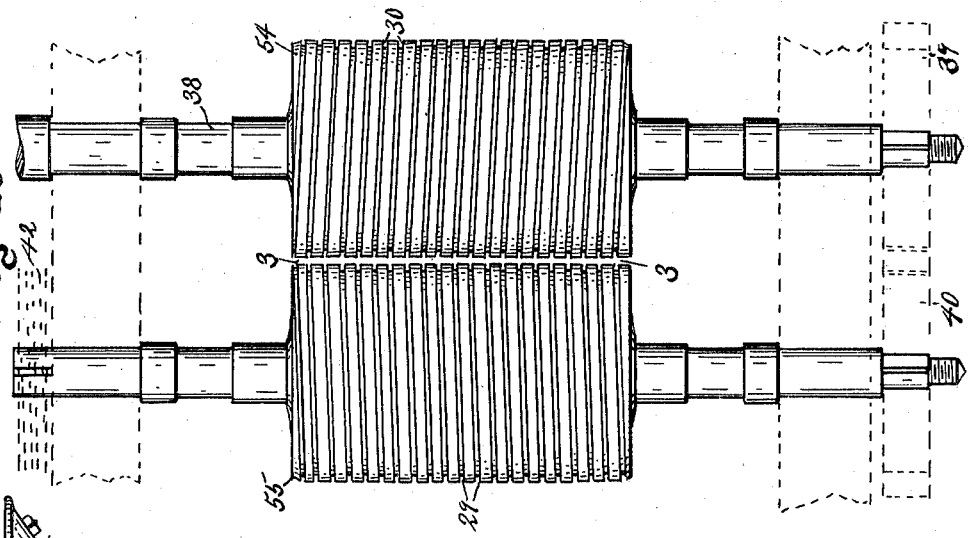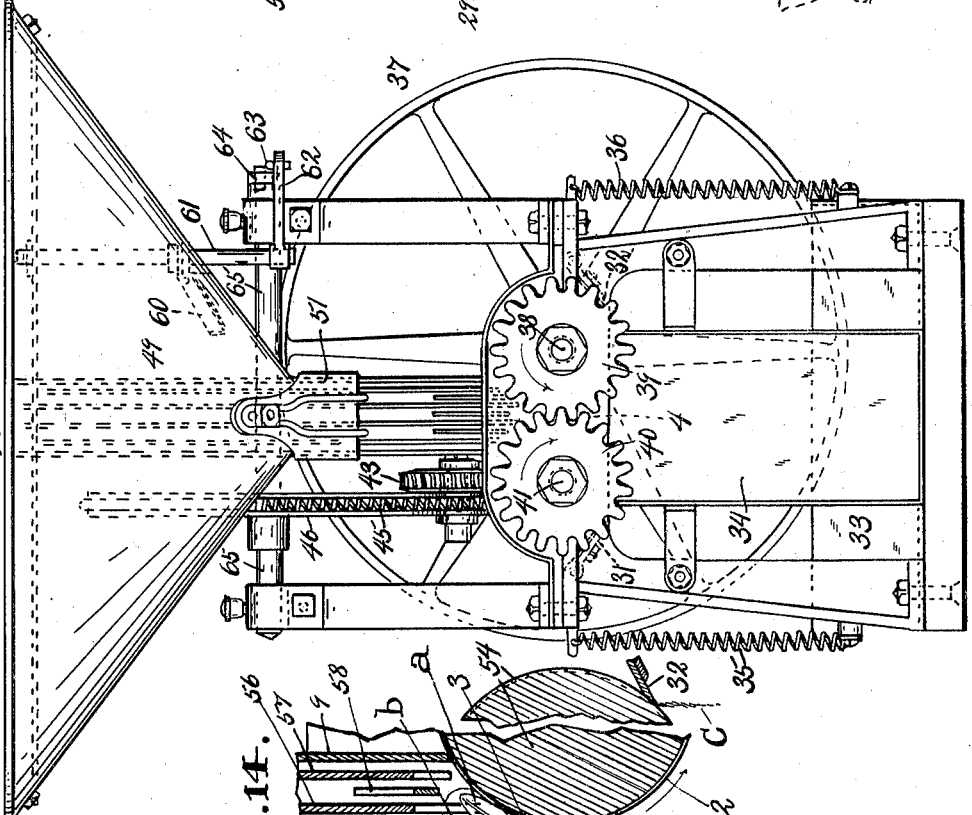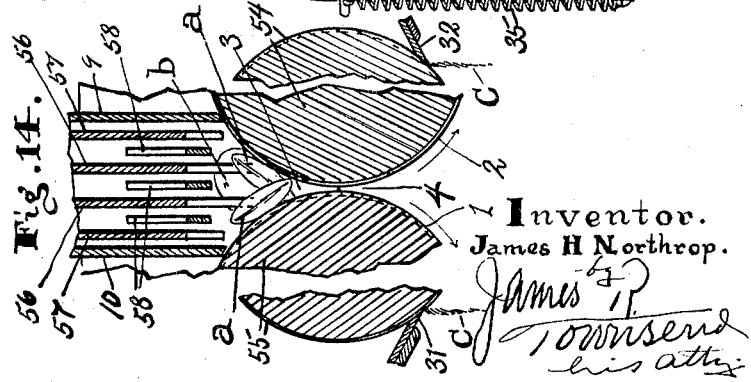

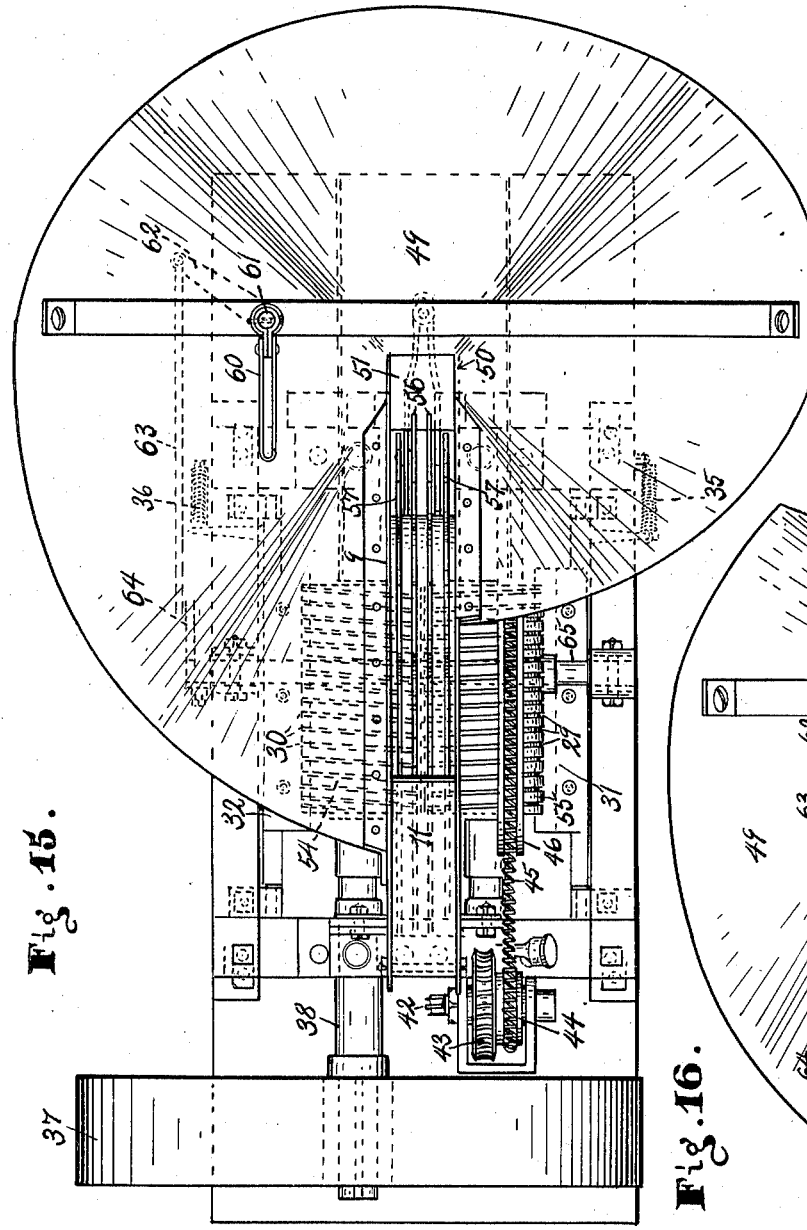

JAMES H. NORTHROP, OF INDIO, CALIFORNIA.

DATE-SHREDDER.

1,307,692. Specification of Letters Patent. Patented June 24, 1919.

Application filed October 24, 1918. Serial No. 259,534.

*To all whom it may concern:*

Be it known that I, JAMES H. NORTHROP, a citizen of the United States, residing at Indio, in the county of Riverside and State of California, have invented a new and useful Date-Shredder, of which the following is a specification.

The general object of this invention is to provide means by which the pulp of dates may be transformed into a new food product which is known as "shredded dates" in my co-pending application, Serial No. 259,533.

Incidental objects are to provide a date pulp shredding machine which will accomplish the work rapidly, and will practically remove all the pulp from the seeds, and will deliver the pulp in superior condition for use as a food and confection.

Date seeding has been carried on by hand and the product has been ground in a meat grinder, but such work of seeding has been slow, and such grinding produces a mass that is not so attractive and palatable as I have been able to produce by other modes of treatment; and an object is to provide a machine by means of which the pulp of various grades of dates can be rapidly transformed into an acceptable, attractive and excellent food product and confection.

An object of this invention is to provide means whereby dates of various qualities may be combined to form a superior food product of greater marketable value than the dates from which such product is made.

An object of this invention is to provide a machine by means of which the pulp may be conveniently and rapidly removed from the seeds of dates, and shredded and put into the date and said pulp can be put in a superior marketable condition.

As is well known, the date is a drupe and is usually of an elongated form, but in date culture within the United States it is found that the fruit from seedling trees varies in shape from an elongate to a globular form with correspondingly shaped stones respectively inside the meat.

An object of this invention is to provide a machine which will operate effectively upon the fruit irrespective of the shape of the seed, to strip the pulp from the seed and deposit it in a shredded condition in a container apart from the seeds.

In the production of dates there are various grades, and various kinds of dates.

An object of this invention is to provide a machine by means of which the less attractive dates can be put in a most acceptable marketable condition by shredding the firmer constituents of the date pulps and combining them with the gummy constituents to form a conglomerate in which said firmer constituents form lumps of the date meat in food condition superior to the natural state.

Heretofore, dates have been pounded and have been ground, thus producing a pasty, homogeneous mass; and an object of this invention is to provide means for separating the seeds and pulp without producing such a mass.

In carrying out this invention in its preferred form I employ rollers; and a difficulty to be overcome is the tendency of the dates to float from the rollers; and the invention is broadly new, primary and pioneer in that it comprises two shredding rollers adjacent each other, in combination with means for introducing dates into the furrow between the upper faces of the rollers with sufficient force to cause the faces of the rollers to gather the pulp of the date and carry it between the rollers, while the seed is expelled along the rollers.

This invention, broadly considered, includes shredding means forming a slot the width of which is less than the diameter of the seeds of the dates to be treated, and is sufficiently wide to allow firmer constituents of the date meat to pass through in the form of shreds unground, and to cause gummy constituents to be pressed onto said firmer constituents, thus forming a conglomerate.

In carrying out the invention I form one side of the slot with a shredding roller, and preferably I form both sides of the slot with shredding rollers, and rotate said rollers over toward each other, and provide means for delivering the dates to the slot and for causing the pulp to be caught between the rollers and to pass through the slot, after which the product is removed from the rollers and collected.

A considerable difficulty is encountered in so feeding the dates to the rollers that the pulp will be separated from the seeds and pass on to form a conglomerate product, and features of this invention relate to means whereby the pulp can be introduced into the space between the rollers.

This invention is broadly new, pioneer and basic in that heretofore there has been no machine by which dates could be seeded and this invention is characterized by a slot having a width less than the shortest diameter of the seeds of the dates to be treated and having a width sufficiently great to allow the firmer as well as the softer portions of the date pulp or meat to pass through in shreds, so that they may be caught and coated by the gummy or pasty constituents of the date.

This invention may be carried out by various constructions and arrangements of parts, and I shall illustrate the same in some of such forms herein, but do not propose to limit the invention to the specific forms and construction, but shall claim the invention generically, and shall point out in the claims specific features of the invention which may be found permissible for this single application.

Other objects, advantages and features of invention, not hereinbefore detailed may appear from the accompanying drawings, the subjoined detail description and the appended claims.

It is understood that the term roller or rollers as used herein is definitive of an elongate body revoluble upon its longer axis and having an external face practically conformed at any transverse section, to a circle; so that when the roller is adjacent to a surface that is in parallelism with a longitudinal trace of the general elongate external face of the roller, said surface would not interrupt the revolution of said face, though brought into contact with said face while the roller were revolving. Said roller may be provided with a helical groove for the purpose of conveying the date or the date seed along the roller, as will be indicated in the accompanying drawings, without practical interference with the shredding function of the roller and the adjacent coöperating surface.

An object of employing a roller of this construction is to allow the active face of the roller to pinch and pick off the exposed surface of the fruit without making a mushy mass out of the pulp. It is desirable that the seed of the date be moved along the face of the roller toward a place of discharge and that the shreds of pulp shall be discharged directly through between the roller and the coöperating surface without being made into a mushy mass. It is also desirable that the active face of the roller be kept free from paste or gum accumulations at that portion which moves toward the coöperating surface, and with the construction of roller herein set forth, these objects are attained.

The accompanying drawings illustrate the invention in some of the various forms in which the invention may be embodied.

Figure 1 is a side elevation partly in vertical mid-section showing in operation the date food product machine in a form which I at present deem most desirable.

Fig. 2 is a fragmental elevation from irregular line $x^2-x^2$ Fig. 1, the same being a fragmental cross-sectional elevation of the preferred form.

Fig. 3 is a side elevation of the machine intact.

Fig. 4 is a plan of the machine shown in the preceding views.

Fig. 5 is a sectional elevation on line $x^5$ Fig. 4.

Fig. 6 is a fragmental sectional elevation on line $x^6$ Fig. 4.

Fig. 7 is a side elevation of the invention constructed in another form.

Fig. 8 is a fragmental plan viewed from line $x^8$ Fig. 7, omitting the belt.

Fig. 9 is a side elevation partly in section, of the machine shown in Figs. 7, 10, and 12, as indicated at $x^8$ Fig. 10.

Fig. 10 is a cross section on line $x^{10}$ Fig. 9.

Fig. 11 is a fragmental perspective view of a portion of the rim of the feeder wheel.

Fig. 12 is an end elevation from the hopper end of Fig. 7.

Fig. 13 is a plan view on an enlarged scale of the rollers shown in Fig. 7.

Fig. 14 is a fragmental sectional view on line $x^{14}$ Fig. 7 showing the stripped date seeds passing through the machine, and the shredded pulp stripped from said date seeds and being scraped from the rollers of the machine shown in Fig. 7.

Fig. 15 is a plan of the machine shown in Fig. 7.

Fig. 16 is a fragmental plan of a portion of Fig. 15.

Fig. 17 is a fragmental sectional elevation showing a part of the stripper.

Fig. 18 is a fragmental plan in section showing the stripper.

In Figs. 1–6 there are two surfaces 1, 2, which are arranged adjacent to each other to form a downwardly narrowing receptacle 3 for dates, and are spaced apart a distance less than the shortest diameter of the respective seeds $a$ of the dates $b$ to be seeded and sufficiently wide apart to form a way 4 through which the pulp $c$ of the dates may pass.

The shredding surfaces 1, 2, are arranged so as not to be in contact with each other when the machine, in operation, is passing the pulp through said space.

Preferably the surfaces are normally spaced apart and remain so during the entire operation of the machine. The shredding surfaces may be spaced apart to form a way so narrow as to barely pass the pulp. The looseness of the bearings of two rollers journaled to furnish said surfaces may be found sufficient for the purpose and I have used rollers such as shredding rollers 5, 6, spaced apart a distance of 1/16 of an inch, in one instance, and in another instance a distance caused by placing a sheet of paper of the thickness of ordinary writing paper in between the rollers and then babbitting the journals in place; but I do not limit the construction to the specific widths mentioned, as greater or less width of way may be found to serve the purpose aimed at. I have found in my experience up to the present date that the operation with the rollers spaced apart by babbitting the journals of the rollers while the roller surfaces are pressed toward each other and against a sheet of writing paper placed between them, gives the best results.

I do not limit the construction to a form in which rollers are employed to produce the shredding surfaces between which the receptacle 3, and way 4, are formed; but I regard the use of one or more shredding rollers as particularly desirable. In carrying out the invention I contemplate using any known equivalent for such rollers.

Said surfaces are adapted to coöperate to separate the date pulps from the date seeds and said coöperation may be effected through movement relative to one or both of said surfaces. Said relative movement may consist of a downward movement of one or both of said surfaces such as may be produced by driving a belt or revolving a roller adjacent to a surface that may coöperate with the moving surface to gather and split and shred the date pulp and carry it down while the date seed is intercepted by reason of the narrowness of the space through which the pulp is allowed to pass.

The two surfaces may be arranged so that the line of nearest approach of one to the other may be at any desired angle to a vertical; and in the accompanying drawings said surfaces are arranged so that the lines of nearest approach of such surfaces to each other is approximately horizontal. This occurs when two horizontal rollers are arranged parallel to each other.

Various means may be employed for introducing or feeding the dates to the receptacle formed between said surfaces at the upper divergence thereof; and in this respect in said Figs. 1–6 the hopper 7 is arranged with one end 8 open to a case composed of side walls 9, 10, and a guard 11 forming a housing for a revolving wheel 12 which is provided with annular lines of teeth formed in plates 13, 14, 15, 16, by notches 17 cut into said plates clear across the surface of the wheel, so that for each notch there is a set of teeth.

Said plates are spaced apart from the walls 9, 10, with sufficient clearance, and they are spaced from each other by spacers 18, 19, 20. The thickness of said spacers is preferably less than the shortest diameter of the seeds of the dates to be operated upon, so that said seeds will not be likely to become wedged in between the plates. Said spacers are preferably circular in form and in the form shown in Figs. 1–6 they are of the same diameter, and the notches 17 are not cut into the surface of the spacers, but the peripheries of the spacers extend circularly near to the bottom of the notches 17.

In said Figs. 1–6 the space between the peripheries of the spacers and the bottoms of the notches is just sufficient to accommodate one or more lines as 21, 22.

Said lines are rove around the spacers and are extended along the floor 23 of the hopper 7, being supported at the ends of said hopper floor 23 by the pulleys 24, 25, and led down from the pulley 25 to a depressing pulley 26 under which it is led, and thence upward to the receiving side of the spacers around which said line is led to the under side of said spacers and thence downward aslant from the wheel to a second depressing pulley 27 from whence the line is led to the supporting pulley 24.

The slanting limbs 28 of the lines between the under side of the wheel and the under side of the second depressing pulley 27, constitute a stripper extending between the two plates outside the peripheries of the spacers and within the notches so that when a date has been caught in a notch and has been carried around within the guard 11 to above the surface of the rollers, said date will fall or will be carried into the furrow or receptacle 3 formed by said diverging surfaces and will become subject to the action of the moving surface of one or both rollers as the case may be. In the form shown both rollers are arranged to revolve from top downward toward each other.

The rollers shown herein are cylinders of equal diameters and are smooth externally along their length, except that one of the rollers is provided with a spiral groove 29 and the other roller is provided with a spiral groove 30. Said grooves are shown as of the same pitch and as being of equal widths and arranged with their turns adjacent to each other at the adjacent sides of the rollers, so that in this particular machine, the companion limbs of said grooves conjointly form a widened space between the rollers, thus to, at one and the same time, increase the friction upon the date, and form a receptacle to receive the end of the date, and at the end of the shredding process, receive the ends of the seeds. The grooved limbs are spaced apart along the smooth surface of the rollers a distance greater than the width of the groove, and the intermediate spaces between the groove limbs or turns of each roller are of greater width than the groove, thus to accommodate to a considerable extent, the date meats at the sides of the seeds, while as the work proceeds, the conjoined groove limbs or turns eventually engage the seeds only; the pulp having been torn or shredded from the seeds by the outer smooth convex face of the rollers and also by friction with the walls of the grooves.

The rollers are driven at a desired speed, for example, three or four hundred revolutions per minute, with the result that the pulp is split from the seed and is carried through the space 4 between the rollers onto the scrapers 31, 32, above the box 33 which is set below the rollers to receive the product which is scraped from the rollers by said scrapers.

The wheel 12 is geared to run at a lower number of revolutions per minute than the rollers and may be run at a speed of say from about 5 to 10 revolutions per minute, and as the teeth pass through the receptacle they carry the seeds along. The advance of the seeds is also facilitated by the grooves of the rollers, when said rollers are provided with such grooves, as shown. As the seeds advance they come beneath the strippers 28 and also extend up between the limbs of said stripper and may come between the stripper limbs and the surface of the rollers, with the result that as the stripper limbs move downward aslant from the wheel by which they are driven, the seeds are carried along in contact, more or less, with the rollers, and are finally ejected through the chute 34 into the seed box 35.

In practice the tendency of the seeds is to rise on end and to be carried along both by action of the grooves upon the lower ends of the seeds, and also by action of the traveling stripper limbs 28, which not only tend to move the seeds along toward the discharge end of the rollers, but also tend to force the seed ends down into the grooves along which they travel, with the consequence that the lower ends of the seeds tend to scour the grooves and keep them from gumming up.

The forward faces of the teeth are arranged slightly advancing so as to insure a propulsive action upon the dates and seeds; but the forward inclination is not so great as to allow the seeds to be caught and held between the stripper and such faces; the necessary action being that the teeth shall pass the stripper, leaving the seeds behind.

The lines forming the stripper are preferably two in number spaced equi-distant from a vertical line passing through the way 4; and said lines are close to the respective rollers so that in practice the seeds have a tendency to assume an upright position, and to travel along the meeting line of the receptacle 3; being carried on by the grooves except in case of congestion when the mass is moved by pressure of the lines against the sides of the seeds. The lines may be of any suitable character and I have used window cords for such element; but in the more practical application I find that the best results are obtained by using lines made of helical springs of about one-quarter inch diameter.

The scrapers are yieldingly held against the peripheries of the rollers by means of helical or coil springs 35, 36.

Power may be applied to the machine by any suitable means, and with this object in view, the power receiving pulley 27 is shown on a shaft 38 of one of the rollers and the power is transmitted with one to one gearing 39, 40, to the shaft 41 of the other roller. Said shaft is provided with a worm 42 meshing with a worm gear 43 which drives a sprocket chain 45, that is geared to a sprocket wheel 46 of increased diameter that is fixed to and transmits power to the shaft 47 of the toothed wheel.

A date support 48 is formed at the receiving side of the depressed loop by means of a plate sloping down from the end of the hopper floor toward the receiving face of the toothed wheel so that the dates carried toward the wheel by the traveling stripper lines will be received in a pocket from which they are caught up by means of the teeth.

The upper horizontal limbs 49 of the stripper lines constitute date agitators and feeders that insure delivering the dates to the pocket from which they may be carried by the teeth.

Said teeth take up the dates one or more at a time, but their construction shown is adapted to prevent jamming the dates into lumpy masses, and the dates are practically acted upon selectively or separately.

The rollers are geared to relatively high speed as compared with the toothed wheel, so that when in operation the power mechanism arranged as above set forth causes the surfaces to coöperate to separate the date pulps from the date seeds, and I do not intend to limit the invention to any specific means to cause such coöperation, nor do I limit it to the specific form of rollers or strippers or other specific features of the machine.

In Figs. 7–18 a form of machine is shown that is somewhat different from that shown in the preceding views.

The floor 49 of the hopper slopes toward an outlet 50. A slotted plate 51 receives the dates on said floor and delivers them to the toothed wheel 52 by which they are caught up and carried over to the receptacle 53 between the rollers 54, 55. The teeth are accommodated by the slots in the slotted plates 51. The central teeth 56 are longer than the side teeth 57 and extend down to a lower level in the receptacle between said rollers.

The stripper is formed by stationary fingers 58 that are held by a support 59 at the seed discharging end of the rollers and said fingers extend rearwardly and upwardly toward the toothed wheel, and toward the receiving end of the receptacle so that in practical operation the date seeds as they progress forward are depressed by the strippers and are held firmly against the rollers; and in case such rollers are grooved as shown, the seeds are made to scour out the grooves as before described.

In this form an agitator for the dates consists of an arm 60 fixed on a rock shaft 61 that has an arm 62 connected by connecting rod 63 to a crank 64 on the shaft 65 of the toothed wheel. Said arm when operated by the revolution of the said toothed wheel agitates the dates in the hopper and directs them toward the discharge outlet.

In the forms where cylindrical rollers are employed, it is deemed advisable that the axes of said rollers shall be parallel to each other.

I claim:

1. A date shredding machine comprising two shredding surfaces spaced apart a distance less than the shortest diameter of the respective seeds of dates to be shredded, and sufficiently wide apart to form a way through which the pulp of the dates may pass in shreds, and means to remove the date pulp from the date seeds and to pass said pulp in shreds through said space.

2. A date shredding machine comprising two shredding surfaces spaced apart a distance less than the diameter of the respective seeds of dates to be shredded, and sufficiently wide apart to allow the pulp of the dates to pass through in shreds, one of said surfaces being revoluble, and means to revolve the revoluble surface to remove the date pulp from the date seeds and to pass said pulp in shreds through said space.

3. A date shredding machine comprising two shredding rollers spaced apart a distance less than the diameter of the respective seeds of dates to be shredded, and sufficiently wide apart to allow the pulp of the dates to pass through, in shreds, and means to rotate one of the rollers to remove the date pulp from the date seeds and to pass said pulp in shreds through said space.

4. A date shredding machine comprising two shredding rollers spaced apart a distance less than the diameter of the respective seeds of dates to be shredded, and sufficiently wide apart to allow the pulp of the dates to pass through, and means to revolve the rollers to remove the date pulp from the date seeds and to pass said pulp through said space.

5. A date shredding machine comprising two shredding rollers spaced apart a distance less than the diameter of the respective seeds of dates to be shredded, and sufficiently wide apart to allow the pulp of the dates to pass through, means to revolve the rollers to remove the date pulp from the date seeds and to pass said pulp through said space, and means to feed dates into the space above the rollers.

6. A date shredding machine comprising two downwardly converging shredding surfaces spaced apart at their nearest approach a distance less than the shortest diameter of the respective seeds of dates to be shredded, and sufficiently wide apart to allow the pulp of the dates to pass through, means to feed dates to the receptacle formed above the line of nearest approach of said surfaces; and means to remove the date pulp from the date seeds and to pass said pulp through said space.

7. A date shredding machine comprising two shredding surfaces spaced apart a distance less than the diameter of the respective seeds of dates to be shredded, and sufficiently wide apart to allow the pulp of the dates to pass through, one of said surfaces being revoluble; means to feed dates to said surfaces; and means to revolve the revoluble surface to remove the date pulp from the date seeds and to pass said pulp through said space.

8. A date shredding machine comprising two shredding surfaces spaced apart a distance less than the diameter of the respective seeds of dates to be shredded, and sufficiently wide apart to allow the pulp of the dates to pass through, one of said surfaces being movable; means to feed dates to said surfaces; and means to move the movable surface to remove the date pulp from the date seeds and to pass said pulp through said space.

9. A date shredding machine comprising two shredding rollers spaced apart a distance less than the diameter of the respective seeds of dates to be shredded, and sufficiently wide apart to allow the pulp of the dates to pass through, means to revolve the rollers to remove the date pulp from the date seeds and to pass said pulp through said space, means to feed dates into the space above the rollers; and a stripper arranged to direct the seeds along the rollers.

10. A date shredding machine comprising a shredding roller and a surface arranged to form therewith a receptacle for dates; means to feed dates to said receptacle; means to revolve the roller to strip the date pulp from the date seeds and to pass such pulp between the roller and said surface; and a scraper to remove from the roller the date pulp adhering thereto.

11. A date shredding machine comprising two shredding rollers arranged adjacent to each other to form a receptacle to receive dates; and means to revolve the rollers for the purpose of stripping the date pulps from the date seeds.

12. In a date shredding machine the combination of a shredding surface and a shredding roller arranged to form a receptacle for dates; means to revolve the roller to strip the date pulp from the date seeds and to pass said pulp between said roller and said surface; the convex face of the roller being provided with a groove to convey the seeds out of said receptacle.

13. A date shredding machine comprising two shredding rollers; said rollers being externally grooved for the purpose of conveying date seeds lengthwise of the rollers; said rollers also being spaced apart to form a way through which the pulp from the date seeds may pass, and means to revolve the rollers.

14. A date shredding machine comprising two shredding rollers; said rollers being externally grooved for the purpose of conveying date seeds lengthwise of the rollers; said rollers also being spaced apart to form a way through which the pulp from the date seeds may pass, and means to revolve the rollers at the same relative speed.

15. A date shredding machine comprising two shredding rollers arranged adjacent to each other to form a receptacle to receive dates; means to revolve the rollers for the purpose of stripping the date pulps from the date seeds, and scrapers to remove the pulp from the rollers.

16. A date shredding machine comprising two surfaces adapted to form a receptacle for dates and also adapted to coöperate to separate the date pulp from the date seeds; one of said surfaces being a shredding surface and means to cause such coöperation between such surfaces.

17. A date shredding machine comprising two shredding surfaces adapted to form a receptacle for dates and also adapted to coöperate to separate the date pulps from the date seeds; means to cause such coöperation between such surfaces; and means to feed dates to said receptacle.

18. A date food product machine comprising two surfaces to form a receptacle for dates and also adapted to coöperate to separate the date pulps from the date seeds; a wheel provided with notches adapted to feed dates to said receptacle, and a stripper to direct dates from the notches of said wheel in said receptacle.

19. A date food product machine comprising means adapted to form a receptacle to receive dates and also adapted to separate the date pulps from the date seeds; a wheel comprising sets of teeth and provided with notches to receive said dates; means arranged to extend between the teeth of said sets to shunt the dates from said notches into said receptacle as the wheel revolves.

20. A date food product machine comprising a hopper to receive the dates; said hopper being open at one end; a wheel having sets of peripheral alined teeth spaced apart; circular spacers between adjacent lines of said teeth; means to revolve said toothed wheel; lines led over the floor of the hopper to the receiving face of the wheel between the lines of the teeth; means for separating date seeds from the date pulp, the same forming a receptacle into which the dates are delivered by said teeth; said lines slanting downwardly from the lower limb of said wheel to form a stripper for stripping the dates and the date seeds from the teeth of the wheel.

21. A date food product machine comprising a hopper having a floor and an open end; a housing open to the open end of the hopper and comprising walls and a guard; a wheel arranged in said housing and provided with teeth to carry dates through the housing; means to revolve the wheel; means to move dates along the floor of the hopper to the teeth of the wheel; means arranged below the wheel to receive the dates therefrom and adapted to remove the date pulp from the date seeds.

22. A date food product machine comprising a hopper to receive the dates; said hopper being open at one end; a wheel having sets of peripheral alined teeth spaced apart; circular spacers between adjacent lines of said teeth; means to revolve said toothed wheel; lines led over the floor of the hopper to the receiving face of the wheel between the lines of the teeth; means to depress the line to form a pocket at such receiving face; means for separating date seeds from the date pulp, the same forming a receptacle into which the dates are delivered by said teeth; said lines also slanting downwardly from the lower limb of said wheel to form a stripper for stripping the dates and the date seeds from the teeth of the wheel.

23. A date food product machine comprising a hopper having a floor and an open end; a housing open to the open end of the hopper and comprising walls and a guard; a wheel arranged in said housing and provided with teeth to carry dates through the housing; means to revolve the wheel; means to move dates along the floor of the hopper to the teeth of the wheel; means arranged below the wheel to receive the dates therefrom and adapted to remove the date pulp from the date seeds; and a stripper formed of lines spaced apart and running aslant downwardly away from the wheel and extending through the hopper to form the conveyer.

24. A date shredding machine comprising two shredding surfaces spaced apart a distance less than the shortest diameter of the respective seeds of the dates to be shredded, and sufficiently wide apart to form a way through which the pulp of the dates may pass; a wheel having peripheral notches and arranged adjacent to said way and adapted to carry the dates toward such way; means to remove the dates from the notches and to introduce them to said way; and means to remove the date pulp from the seed and to pass the pulp through said way.

25. In a date food product machine, a toothed wheel provided with sets of alined teeth and circular surfaces between the lines of such teeth; rollers arranged to form a receptacle into which dates may be fed from such wheel; lines rove around said circular sufaces and along said receptacle and slanting downwardly from the lower limb of the wheel; and means to simultaneously revolve the wheel and the rollers.

26. In a date food product machine, a toothed wheel provided with sets of alined teeth and circular surfaces between the lines of such teeth; rollers arranged to form a receptacle into which dates may be fed from such wheel; lines rove around said circular surfaces and along said receptacle and slanting downwardly from the lower limb of the wheel; and means to simultaneously revolve the wheel and the rollers at different speeds.

27. In a date food product machine, a toothed wheel provided with sets of alined teeth and circular surfaces between the lines of said teeth; rollers arranged to form a receptacle into which dates may be fed from such wheel; lines rove around said circular surfaces and along said receptacle and slanting downwardly from the lower limb of the wheel; and means to simultaneously revolve the wheel at one speed and the rollers at a higher speed.

28. In a date food product machine, a toothed wheel provided with sets of alined teeth and circular surfaces between the lines of said teeth; rollers arranged to form a receptacle into which dates may be fed from such wheel; lines rove around said circular surfaces and along said receptacle and slanting downwardly from the lower limb of said wheel; and means to simultaneously revolve the wheel at one speed and the rollers at a different speed.

29. A date food product machine comprising a surface and a roller arranged adjacent to each other to form a receptacle for dates, and spaced apart to form a way through which the date pulp may pass but not wide enough to allow the date seeds to pass; a wheel provided with sets of teeth and being notched to accommodate the dates and arranged to feed dates to said receptacle; the intermediate teeth of said sets being longer than the side teeth of said sets so that the intermediate teeth extend farther into the receptacle than the side teeth; and means to strip the dates and the date seeds from said notches as the same pass through the receptacle.

30. The combination with two shredding rollers arranged to form a receptacle for dates and a way through which date pulp but not date seeds may pass; of a toothed wheel revolving on an axis that is transverse to the axis of the roller revolution to deliver dates to the receptacle; means to revolve the rollers; and speed reducing means between the rollers and the wheel to revolve the wheel at a lower speed than the rollers.

31. A date shredding machine comprising two shredding rollers arranged adjacent to each other to form a receptacle for dates, and spaced apart to form a way through which the pulp from said dates may be passed; said way being too narrow to allow the passage of the date seeds between the rollers; means to rotate the rollers and means to supply dates to said receptacle.

32. A date shredding machine comprising a shredding roller and a surface adjacent thereto; said roller and surface forming a receptacle to receive dates; said roller being spaced apart from said surface sufficiently to form a way through which the date pulp may pass and through which the date seed may not pass; means to supply dates to said receptacle and means to rotate the roller.

33. A date shredding machine comprising two shredding surfaces adapted to allow the pulp of dates to pass therebetween, one of said surfaces being in the form of a roller having a helical groove which is adapted to receive and advance the ends of the seeds of dates during the operation of shredding the pulp of dates from seeds by the action of such roller; and means for revolving the roller.

34. In a date food product machine, in combination with a shredding surface, a shredding roller adjacent thereto and cooperating therewith; said roller having in its surface a helical groove which is adapted to receive the end of a date seed and to advance the date seed along said surface as the roller is revolved; the adjacent limbs of said groove being spaced apart a distance greater than the width of the groove so that the portion of the roller surface between the turns of the groove may coöperate with the adjacent surface to shred pulp from dates; and means to revolve the roller.

In testimony whereof, I have hereunto set my hand at Los Angeles, California, this 5th day of October 1918.

JAMES H. NORTHROP.

Witness:
JAMES R. TOWNSEND.